United States Patent [19]
Tiller

[11] Patent Number: 5,972,403
[45] Date of Patent: Oct. 26, 1999

[54] METHOD FOR PRODUCING FISH MEAL

[75] Inventor: Clinton Hiram Tiller, Morristown, Tenn.

[73] Assignee: Trident Seafoods Corporation, Seattle, Wash.

[21] Appl. No.: 08/920,163

[22] Filed: Aug. 27, 1997

[51] Int. Cl.[6] .............................. A23B 4/03; A23B 4/044
[52] U.S. Cl. ......................... 426/467; 426/469; 426/478; 426/492; 426/495
[58] Field of Search .................................. 426/641, 643, 426/467, 469, 478, 492, 495

[56] References Cited

U.S. PATENT DOCUMENTS

| | | |
|---|---|---|
| 2,334,703 | 11/1943 | Henkel . |
| 2,370,974 | 3/1945 | Langdon . |
| 2,562,646 | 7/1951 | Sharp et al. . |
| 3,478,874 | 11/1969 | McLean et al. . |
| 3,673,065 | 6/1972 | Anderson . |
| 3,816,274 | 6/1974 | Anderson . |
| 3,959,518 | 5/1976 | Vincent ................................. 426/643 |
| 4,059,511 | 11/1977 | Musha et al. . |
| 4,122,208 | 10/1978 | Tronstad ............................... 426/641 |
| 4,216,085 | 8/1980 | Chittenden . |
| 4,335,146 | 6/1982 | Bladh .................................... 426/231 |
| 4,976,973 | 12/1990 | Shirakawa et al. ....................... 426/7 |
| 5,080,802 | 1/1992 | Cairo, Jr. et al. . |

*Primary Examiner*—Nina Bhat
*Attorney, Agent, or Firm*—Christensen O'Connor Johnson & KindnessPLLC

[57] ABSTRACT

A method for removing salt and water from a fish meal production process stream without sacrificing fish protein solids that are to be recovered as final product. Fish oil and fish protein solids are allowed to separate from water in the process streams, allowing for the removal of water and dissolved salt without the removal of substantial amounts of fish protein solids.

16 Claims, 4 Drawing Sheets

METHOD FOR PRODUCING FISH MEAL

FIELD OF THE INVENTION

The present invention relates to a process for producing fish meal from the fish carcasses or whole fish.

BACKGROUND OF THE INVENTION

Fish meal is a fishery by-product consisting essentially of process scrap from the filleting operation or from whole fish. Fish meal can be produced by a dry process wherein waste from cod, halibut, and haddock heads is disintegrated and dried.

Figure 1:
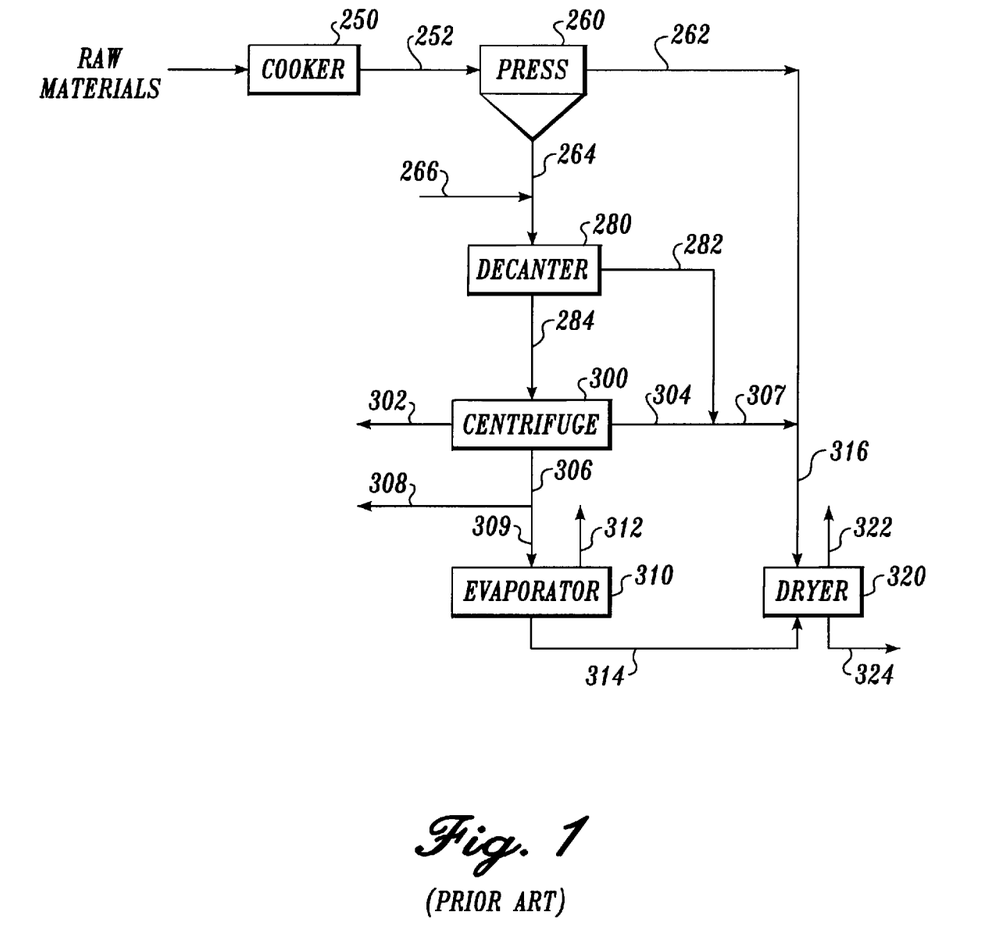
FIG. 1 is a schematic flow diagram for a prior art process for producing fish meal.

A wet process also exists for the production of fish meal. FIG. 1 illustrates a known process for producing fish meal from the carcasses of processed pollock. In this known process, the processed carcasses 240 are cooked in a steam cooker 250 prior to delivery to a screw press 260 that separates the cooked carcasses into a press cake 262 rich in solids and a press fluid 264 rich in fluids. The press cake is delivered to a dryer 320 where water 322 is removed and fish meal 324 is recovered. The press fluid is processed through a decanter 280 which separates the press fluid into sludge 282 rich in solids and a fluids rich component 284. The sludge is delivered to the dryer where water is removed and fish meal recovered. The fluids rich component is delivered to a centrifuge 300 that is used to separate fish oil 302 from the fluids rich stream and provide a solids cake 304 and a fluid stream 306. An evaporator 310 is used to remove water 312 from the fluid stream from the centrifuge and concentrate the fish protein solids 314 in the fluid stream from the centrifuge. The concentrated fish protein solids are then delivered to the dryer for removal of the residual water. Each of the successive separations performed by the decanter, centrifuge, and evaporator recovers a portion of the fish protein solids that the previous separation process was unable to isolate and recover.

The increasing worldwide demand for processed fish products has resulted in the production of larger amounts of fishery by-products which are available to be processed into fish meal. In an effort to recover the fish protein solids present in these raw materials and convert them into fish meal, existing fish meal production facilities are often pushed to capacity or over capacity. A typical raw material stream includes 70–80% water in which the fish protein solids are either dissolved or suspended. During the production of fish meal, this water must be treated and the fish protein solids separated therefrom. In existing fish meal processing plants, it is often the capacity of the separation operations, such as the decanter, centrifuge, evaporator or dryer that limits the volume of water that can be handled by the system. While it may be possible to upgrade the existing equipment by replacing it with larger capacity equipment, such upgrades do not come without an economic cost. A similar dilemma is faced in the building and design of new fish meal production facilities. The need for larger capacity separation equipment naturally makes the return on investment lower.

When the raw material originates from fish that were refrigerated in salt water, steps must be taken to remove a portion of the salt so that the recovered fish meal product has an overall salt content that meets industry standards. Typically, industry standards are set at about 2%–3% salt for the fish meal product. It has been proposed that electrocoagulation or hyperfiltration could be used to remove salt from the fish meal process streams without a significant removal of fish protein solids therefrom. Such prior attempts have met with limited acceptance and success. As a result of the unavailability of an effective means of removing salt from fish meal process streams, certain fish meal processing plants remove salt by sacrificing a portion of the recoverable fish meal and dumping it as a waste product. This poses at least two potential problems. First, there is the economic loss associated with the loss of the fish protein solids and fish oil present in the wasted material. Additionally, the fish protein solids in the wasted material make it more difficult to dispose of the material, particularly given the present environmental climate.

SUMMARY OF THE INVENTION

A method for producing fish meal carried out in accordance with the present invention simply, effectively, and economically reduces the volume of water present in the process without sacrificing significant amounts of otherwise recoverable fish protein solids. In addition to minimizing the loss of recoverable fish protein solids when water is removed from the system, in accordance with the method of the present invention, the amount of water that must be removed by equipment that requires large inputs of energy, such as centrifuges, evaporators and dryers per unit of fish meal is reduced. Therefore, the amount of fish protein solids that can be effectively recovered by these operations is increased. Another advantage of a method carried out in accordance with the present invention is that it reduces the volume of water present in the process stream without high energy or capital costs. In addition, a method of producing fish meal carried out in accordance with the present invention provides for the removal of salt from the process stream without sacrificing unnecessary amounts of fish protein solids. Thus, a method for producing fish meal carried out in accordance with the present invention provides a means for owners of existing fish meal processing plants to increase the rate at which fish meal is produced and in certain situations such as refrigerated salt water fish, increase the overall conversion efficiency of raw material to fish protein solids. All the above are achieved while at the same time reducing the production of potentially difficult to dispose of waste streams.

A method for producing fish meal in accordance with the present invention comprises the steps of first providing a stream comprising fish protein solids, fish oil, and water. This stream is delivered to a flotation vessel, where the fish protein solids, fish oil, and water are held in a quiescent state such that the fish oil rises forming an oil-water interface. The rising fish oil causes a portion of the fish protein solids to also rise to the oil-water interface, thereby defining an oil layer that includes fish oil and floated fish protein solids and a water layer that includes unfloated fish protein solids. In order to recover the floated fish protein solids, the oil layer is isolated from the water layer. Thereafter, the floated fish protein solids are separated from other components in the oil layer.

In a preferred embodiment, a method for producing fish meal carried out in accordance with the present invention includes the steps of first cooking fish waste to produce a stream comprising fish protein solids, fish oil, and water. This stream of cooked fish waste is pressed to form a press cake and a press fluid, the press cake containing a higher concentration of fish protein solids compared to the press fluid. The press fluid is processed further to separate additional fish protein solids therefrom to provide a secondary press fluid comprising fish protein solids, fish oil, and water. The fish oil and fish protein solids in the secondary press fluid are then concentrated by separating the fish oil and protein solids into an oil phase and concentrating the water in the secondary press fluid into a water phase. The oil phase rich in protein solids is then isolated from the water phase and treated to recover fish protein solids therefrom.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Fish meal consists of fish protein solids as a primary component, and lesser amounts of fish oil, salt and water that are recovered from the process scrap from filleting operations or from whole fish. Examples of fish that typically serve as sources for raw materials for a fish meal processing plant include cod, halibut, haddock, menhaden, pilchard, and pollock. Primary uses for fish meal are animal feeds and raw materials for fish protein concentrate.

In the following description, certain process streams will be described as including fish protein solids, fish oil, water, and salt. It should be understood that reference to any particular component is not intended to limit the make-up of that stream to only that component. In fact, each process stream will include varying amounts of fish protein solids, fish oil, water, and salt. For example, suspended fish protein solids that are separated by the press, decanter, new flotation vessel, centrifuge, and evaporator described below will in most instances include a certain amount of water associated therewith. This water will include a certain amount of salt dissolved therein. In addition, the separated suspended fish protein solids will also carry with it a certain amount of fish oil. When the raw materials originate from fish that are refrigerated in salt water, each of the process streams will include even greater amounts of salt compared to streams present when the raw material is not from fish refrigerated in salt water. It should be understood that reference to water in the following description refers to both water and any salt that is dissolved therein. Since the overall goal of the process is to recover fish meal, those streams that are rich in solids (i.e., streams having higher concentrations of solids than the fluid-rich streams) will have, as a primary component, fish protein solids. In contrast, those streams that are generally fluid in nature will contain fish protein solids, but generally at concentrations less than the solids-rich streams.

Figure 3:
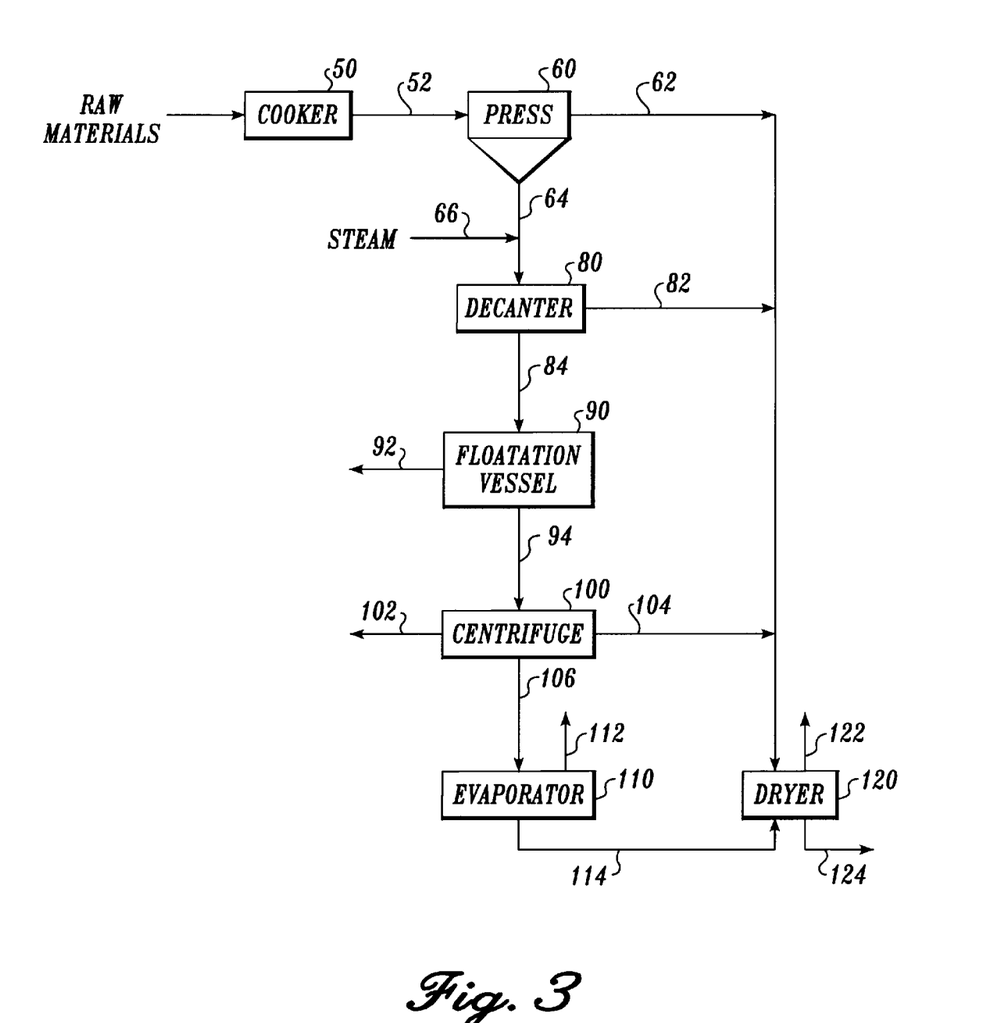
FIG. 3 is a schematic flow diagram for a method of producing fish meal in accordance with the present invention.
Figure 4:
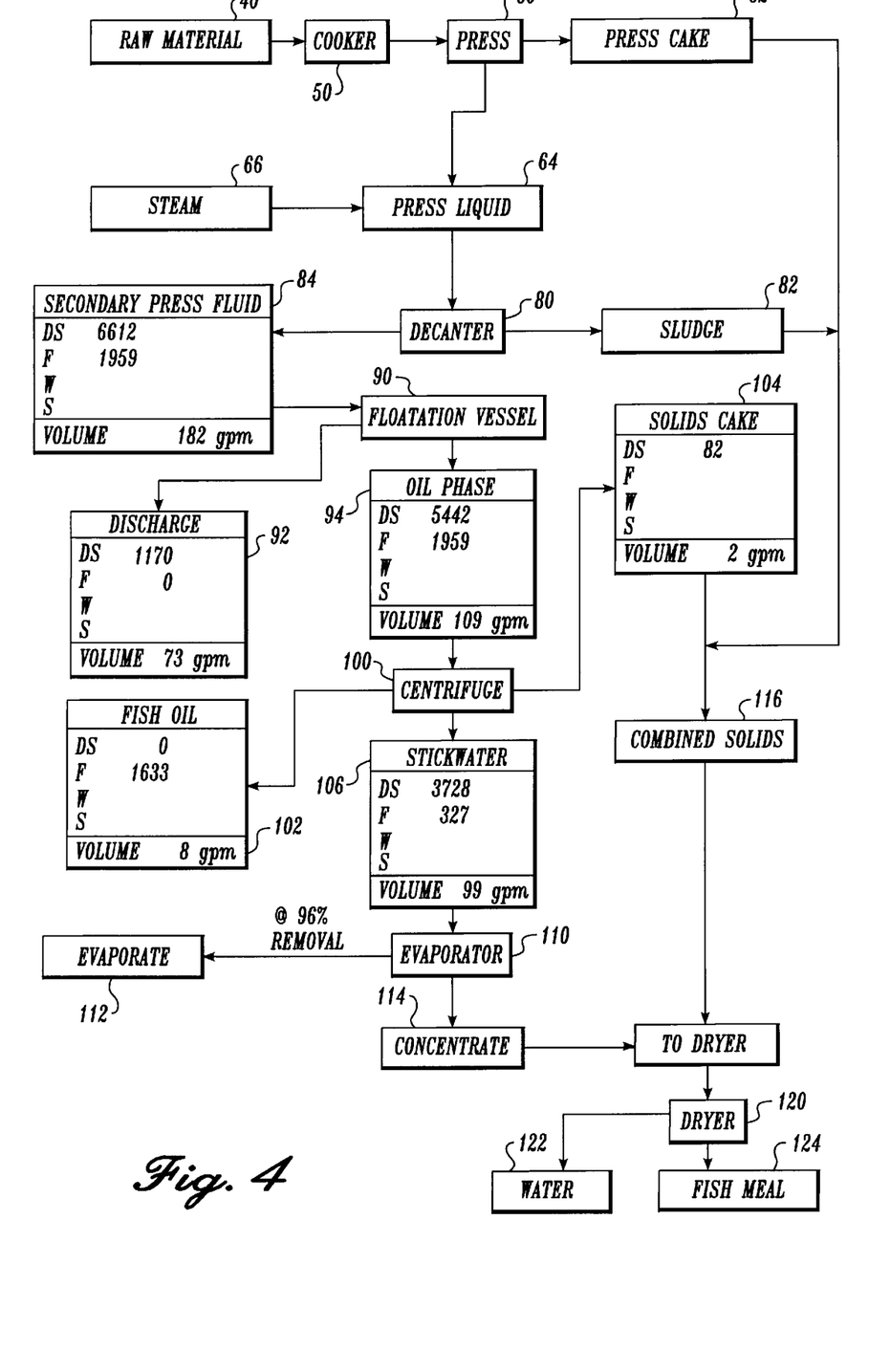
FIG. 4 is a mass balance diagram for the flotation vessel illustrated in FIG. 3.

The reference in the following description to fish protein solids refers to protein that is derived from the raw materials. In the context of the present description, fish protein solids can be characterized as either being dissolved, e.g., protein that is water or oil soluble, and suspended, e.g., protein solids which have not been solubilized. It should be understood that other solids, such as ash which is primarily derived from the bones of the raw materials, will be present in the various process streams. The reference to dry solids in FIGS. 3 and 4 is intended to encompass all of the fish protein solids whether dissolved or suspended and the ash present in the various process streams. Another primary difference between the dissolved fish protein solids and the suspended fish protein solids is that the dissolved fish protein solids are generally not removable by mechanical means such as decanters and centrifuges, while the suspended solids can be removed by mechanical means such as decanters or centrifuges or settlers. Generally, recovery of dissolved protein solids in the process of the present invention is limited to the dryers and evaporators where water is evaporated and the soluble protein is left behind. The press, decanter, centrifuge and flotation tank of the present invention generally are only capable of removing suspended protein solids from the water component.

Fish oil as used in the following description refers to the fats and oils that are naturally present in the raw materials and which are extracted therefrom during the course of the production of fish meal in accordance with the present invention.

The present invention as it relates to a method for producing fish meal results from the discovery that suspended fish protein solids can be separated from a well mixed suspension or mixture of suspended fish protein solids, fish oil and water by maintaining the mixture in a quiescent state within a vessel. It has been observed that when such a mixture is maintained in a quiescent state, the fish oil begins to rise and form an oil-water interface above the water, suspended protein solids also rise and are thus separated from the water. Once a desired state of separation of the oil and suspended protein solids is achieved, either the water component which comprises primarily water, soluble fish protein solids, and some residual fish oil and suspended protein solids can be withdrawn for further processing or disposal. Likewise, the fish oil and floated fish protein solids that have separated from the water can be removed for further processing as described below in more detail. In this manner, a method carried out in accordance with the present invention simply, effectively, and economically separates fish oil and suspended fish protein solids from water in the fish meal process stream, and thus reduces the volume of material that otherwise would require handling by subsequent separation steps. Before the separation described in the previous paragraph can be implemented, the mixture of water, fish oil, soluble fish protein solids, and suspended fish protein solids is provided as described below.

Referring to FIG. 3, raw material 40 comprising whole fish or fish carcasses is delivered to cooker 50 where the temperature of the raw material is elevated so that the fat in the fish carcass is liquified and the protein denatured so that water present in the tissue is released. A suitable cooker includes a tubular elongate steam jacket carrying a screw for advancing the raw materials. The screw may optionally be fitted so that steam can be provided to the interior of the screw. Typical operation temperatures for the cooker range from about 45° F. to about 190° F. It should be understood that the present invention is not limited to the particular cooker 50 described herein.

Exiting cooker 50 is stream 52 that is delivered to press 60. Although not illustrated, it should be understood that conveyors, pumps, or other conventional means for transporting viscous semi-fluid process streams are employed in the present invention to transport materials from one operation to another.

Press 60 performs a two-phase separation of process stream 52 into a press cake which is delivered via line 62 to dryer 70 described in more detail below. The second phase produced by press 60 is a press fluid carried in line 64 to decanter 80. An example of a suitable press is a twin screw press such as those available from Atlas Industries and Stord International. While a particular example of the type of press that can be used for press 60 has been described above, it should be understood that the present invention is not limited to any particular type of press.

Figure 2:
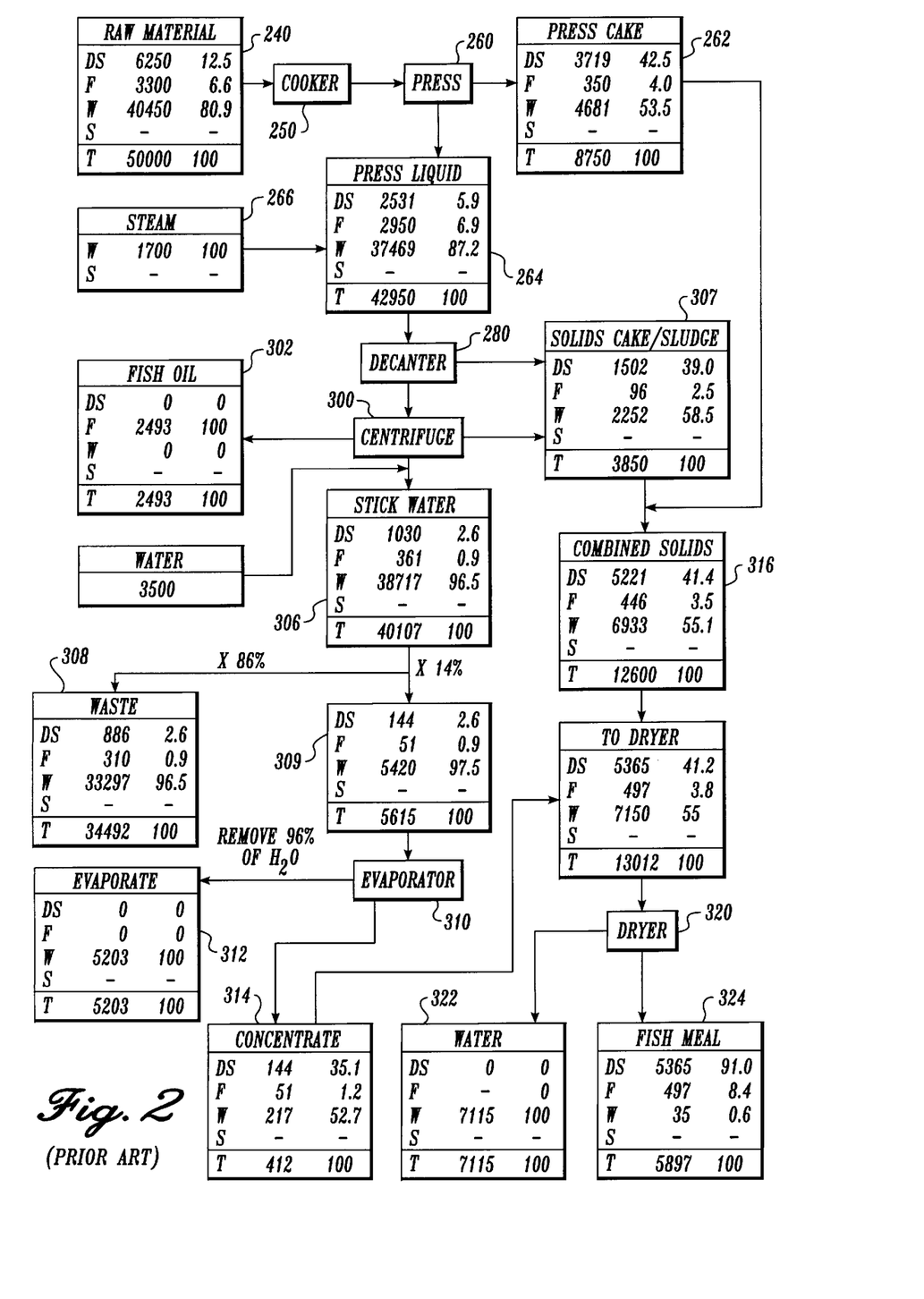
FIG. 2 is a mass balance diagram for the prior art process for producing fish meal illustrated in FIG. 1.

Referring to FIG. 4, an exemplary mass balance of the various streams into and out of flotation vessel 90 set forth and described below with reference to FIG. 3 is provided. The particular composition of a stream identified by a given reference number in FIG. 3 can be found in the corresponding block in FIG. 4 that is identified by the same numeral. In FIGS. 2 and 4, "DS" refers to the dry solids content of the stream, "F" refers to the fish oil component, "W" refers to the water content and "S" refers to the salt content. The values given in FIG. 2 are in kilograms/hour in the second column and weight percents in the third column "T" refers to the total Kg/hr for a given stream. In FIG. 4, weight percents are not provided, but a total volume flow in gallons per minute is provided.

It was observed that the quality of the separation between the oil phase and water phase in the flotation tank described in more detail below improved as the temperature of the materials entering the flotation tank approached the boiling point of water. Accordingly, in order to elevate the temperature of the press fluid (which ultimately is delivered to the flotation tank after being treated in decanter 80 as described below), steam is injected via line 66 into line 64. Preferably, the steam elevates the temperature of the press fluid to about 190° F.–200° F.

The heated press liquid is received by decanter 80. Decanter 80 performs a two-phase separation of the heated press liquid, producing a sludge in stream 82 and a secondary press fluid in line 84. Decanter 80 achieves a two-phase separation in a conventional manner by relying upon the density differential between the materials forming the sludge and the materials forming the secondary press fluid. It should be understood that decanters of conventional designs such as those available from Alfa Laval and Westfalia are suitable. In addition, other types of settlers or separators that rely upon differential densities could be employed at this stage of the process.

The secondary press fluid in line 84 is then delivered to a flotation vessel 90 capable of retaining the secondary press fluid in a quiescent state, such as an unagitated tank with a vented closed top. The secondary press liquid comprising fish oil, water, soluble fish protein solids, and suspended fish protein solids is introduced into vessel 90, preferably at the top of the tank in order to ensure that initially a well stirred mixture is achieved. After the tank is filled, the introduction of the secondary press fluid is stopped and optionally diverted to another flotation vessel (not shown), as described below in more detail. The secondary press fluid is then maintained in the flotation vessel in a quiescent state, i.e., in the absence of agitation that would otherwise impede the separation of the fish oil and suspended fish protein solids from the water. The oil because of its lower density begins to rise through the water. As the rising oil coalesces, an oil-water interface is formed.

It is believed that the rising fish oil serves as the driving force to float suspended fish protein solids that would otherwise not float to the top of the water, and in fact, due to their density being equal to or greater than water would have a tendency to either remain suspended or settle within the water after extended periods of time. While the foregoing is believed to be the mechanism by which the suspended fish protein solids separate from the water, it should be understood that the present invention is not intended to be limited to such theory. In addition to the fish oil serving as a driving force causing some of the suspended fish protein solids to rise to the oil-water interface, it is also contemplated that some fish protein solids may be dissolved in the oil and thus will be separated from the water as the oil coalesces above the water.

As the length of time that the secondary press fluid is retained within the flotation vessel grows, more and more fish oil rises and coalesces, forming a distinct oil phase that is rich in fish oil and floated fish protein solids above the water phase which is rich in water, and also includes soluble fish protein solids, fish oil, salt, and unfloated suspended fish protein solids.

For a secondary press fluid having a composition indicated in stream 84, fed into a 10,000 gallon flotation vessel at a temperature of approximately 195° F.–200° F., effective separation of the fish oil/fish protein solids, and the water is observed to occur in approximately 30–60 minutes. The effective completion of the separation of the oil from the water is considered complete when the fluid in the flotation vessel separates into a transparent phase and an opaque phase and the interface between the phases is stable. It should be understood that separation of the fish oil and the water and thus the separation of the suspended fish protein solids from the water can be achieved in shorter times if a lesser volume is maintained in a quiescent state and, conversely, if a larger volume is contemplated, it may take longer to achieve effective separation. In addition, as explained below, factors such as the temperature and the ratio of oil to water and suspended fish protein solids may affect the time required to achieve effective separation.

As described above, it was observed that the temperature of the secondary press fluid within flotation vessel 90 affects the rate at which the oil and suspended fish protein solids separate from the water. Generally, the higher the temperature the more rapid the rate of separation, provided the water is not caused to boil. Accordingly, the temperature of the secondary press fluid in flotation vessel 90 is preferably maintained close to but below the boiling point of the water. It appears that as the temperature approaches the boiling point of the water in the secondary press fluid, the magnitude of the marginal increase in the rate of the separation begins to decrease and thus, consideration must be given to the cost associated with increasing the temperature of the secondary press fluid to near the boiling point of the water. Maintaining the secondary press fluid at a temperature ranging between about 195° F. and about 200° F. provides a good balance between the rate of the separation and the cost of heating the secondary press fluid to such elevated temperatures.

Another factor that affects the separation of the suspended fish protein solids from the water in the flotation vessel is the amount of fish oil present in the secondary press fluid. Preferably, the amount of fish oil present in the secondary press fluid is at least about 1.5%–2% by weight. When the oil content is less than about 1.5 wt. %, separation is achieved but it is not as complete or rapid as when the fish oil content is greater than about 1.5 wt %. When the secondary press fluid has an oil content less than about 1.5 wt. %, consideration can be given to adding additional fish oil in order to raise the level of fish oil present to above 1.5 wt. %. This should facilitate a more effective separation of the suspended fish protein solids from the water.

It should be understood that multiple flotation vessels could be employed in order to incorporate the batchwise separation in the flotation vessels described above into a continuous process. Although each of the multiple tanks would operate on a batch basis, they nonetheless could be used in concert to receive secondary press fluid on a continuous basis and provide a concentrated fish oil and floated fish protein solids stream on a continuous basis. Alternatively, the tank used as a flotation vessel could be designed to: (1) receive the secondary press fluid continuously provided that the secondary press fluid was introduced into the tank in a manner that did not hinder the separation of the fish oil and fish protein solids from the water or that minimized any adverse effects on the separation; and (2) provided for the withdrawal of the fish oil and floated protein solids and water in a manner that does not adversely impact the desired separation.

Once separation of the fish oil and suspended fish protein solids from the water is complete in the flotation vessel, the underlying water component is drawn from the flotation vessel through an outlet located near the bottom of vessel 90. The removed water in line 92 contains soluble fish protein solids and a small amount of suspended fish protein solids. The overall amount of fish protein solids present in the water phase is generally low enough to meet environmental discharge limitations and therefore, the water can be discharged preferably without further treatment. Alternatively, if the separated water does not meet regulatory requirements, it can be further processed in a conventional manner to meet environmental regulations.

Completion of the removal of the water phase from flotation vessel 90 is evidenced by a change in the color of the stream in line 92. The water being removed tends to be a somewhat cloudy, turbid mixture while the mixture of fish oil and floated fish protein solids has the consistency of a loose milk shake. Accordingly, as soon as the operator observes that the color of the stream exiting flotation vessel 90 changes, the stream can be redirected to centrifuge 100 via line 94. In FIG. 3, line 94 is illustrated as having a separate port within flotation vessel 90. It should be understood that an alternative to a separate port would be a tee provided in line 92 with a valve capable of redirecting flow from vessel 90 into line 94.

As can be seen from the mass balance in FIG. 4, the water component removed via line 92 comprises primarily water and dissolved fish protein solids and suspended fish protein solids. The majority of the fish oil and suspended fish protein solids has been separated from the water in line 92 and delivered via line 94 to centrifuge 100 for further processing. Flotation vessel 90 effectively reduces by at least 10%, preferably by at least 25% and most preferably by at least 40% the volume of the secondary press fluid 84 delivered to the centrifuge 100. In this manner, the flotation vessel and method of the present invention effectively increase the overall capacity of fish meal processes where the capacity of the centrifuge or other unit operation downstream of the centrifuge act as bottlenecks to limit the overall capacity of the fish meal process.

When the source of the raw materials are fish or fish carcasses that have been refrigerated in salt water, the amount of salt present in the respective process streams is greater than when the source of raw materials is not refrigerated in salt water. As noted above, preferably, the recovered fish meal does not contain generally more than about 2–3 wt. % salt. Accordingly, the removal of salt at some point during the process becomes necessary. In accordance with another aspect of the present invention, flotation vessel 90 serves to simply, economically and effectively permit the separation of salt from the suspended fish protein solids by separating the suspended fish protein solids from a majority of the water as discussed above. Since the salt remains in solution in the water, when a large portion of the water present in the secondary press fluid is separated from the fish oil and floated fish protein solids, a large proportion of the salt in the secondary press fluid is also separated from the fish oil and floated protein solids. While the separated fish oil and floated fish protein solids will include some water associated with the fish protein solids, that amount is preferably low enough such that the recovered fish meal product does not include excessive amounts of salt.

In accordance with the embodiment of the present invention illustrated in FIG. 4, the fish oil and floated protein solids in line 94 are received by centrifuge 100. Centrifuge 100 separates the mixture into three phases. A first phase comprising primarily fish oil in line 102, a solid cake in line 104, comprising primarily fish protein solids and stickwater in line 106 comprising primarily water. Centrifuge 100 is of a conventional design capable of separating a stream comprising solids, oil, and water into three separate streams. One example of a suitable centrifuge is a high speed or disc centrifuge. It should be understood that other types of centrifuges or other types of separation equipment can be used provided they provide effective separation of the mixture of fish oil, fish protein solids, and water in line 94 into fish oil, a solids cake comprising primarily fish protein solids and stickwater comprising primarily water. It should be understood that the present invention is not limited to the centrifuge set forth above. Since centrifuge 100 does not need to process the water removed by the flotation vessel, its capacity relative to the overall fish meal process is effectively increased. As noted above, the removal of water in the flotation vessel also effectively increases the capacity of other operations downstream of the flotation vessel.

Stickwater is delivered via line 106 to evaporator 110 that converts the water present in the stickwater to vapor and discharges the vapor via line 112 leaving behind concentrate which is delivered via line 114 to dryer 70. A suitable evaporator is a mechanical vapor decompression evaporator. It should be understood that other types of evaporators capable of removing water from the stickwater can be employed.

In addition to concentrate in line 114, dryer 70 also receives press cake in line 62, sludge in line 82, and solids cake in line 104. Dryer 70 removes additional water from these components and provides a dried fish meal product via line 124. Dryer 70 can be of conventional design such as a hot air-type dryer that dries by exposing the cake to large volumes of rapidly moving hot air. Alternatively, a steam jacket dryer can be used. It should be understood that the present invention is not limited to any particular type of dryer provided that the dryer is capable of removing water from the press cake, sludge, solids cake, and concentrate described above to produce a fish meal product.

Referring to FIG. 2, based on the mass balance, the volume of stickwater in line 308 that is removed from stream 306 is substantial. Disposal of this waste stream poses potential environmental concerns. The alternative of further processing the stream to reduce the concentration of objectionable components introduces added costs into the overall process. In contrast, referring to FIG. 4, the discharged water in line 92 from flotation vessel 90 contains a lower concentration of fish protein solids, making it more likely that the stream can be disposed of without further treatment.

Furthermore, the mass balance for the prior art process illustrated in FIG. 2 illustrates how stickwater in line 308 which is to be wasted contains approximately 35% of the overall fish protein solids and ash that are present in the press liquid 264. When stickwater in line 308 is wasted, so is a significant amount of the potentially recoverable fish meal product. In contrast, the discharge in line 92 from flotation vessel 90 in FIG. 4 contains about 7% of the overall fish protein solids and ash in press liquid 64, thus, very little of the potentially recoverable fish protein solids product is lost unnecessarily in a process carried out in accordance with the present invention.

As noted above, in addition to addressing the issues regarding removing salt from the system and reducing the fish protein content of the discharge stream, the present invention also significantly reduces the volume of water that must be removed by centrifuge 100, evaporator 110, and dryer 120 without wasting a significant amount of the recoverable fish protein solids. Accordingly, the amount of fish meal product recovered based upon the energy expended in the centrifuge, evaporator, and dryer is increased. Finally, the present invention provides particular advantages in those existing fish meal processing plants where the capacity of centrifuges, evaporators, or dryers are near capacity and there is a need to increase the production rate of fish meal. Since the method of the present invention removes a large volume of the water prior to the need for a centrifuge, evaporator, or dryer, less water must be removed by the centrifuge, evaporator, or dryer and, therefore, more fish protein solids can be processed through these centrifuges, evaporators, or dryer without the need to increase their overall capacity.

EXAMPLE

This example illustrates how a mixture of fish protein solids, fish oil, water, and salt is treated in accordance with the present invention to separate salt and water from the mixture without an attendant loss of significant amounts of fish protein solids.

A 10,000 gallon stainless steel tank in the shape of an upright cylinder, fully closed with a vent provided in the top is charged with approximately 250,000 kilograms of a mixture of fish protein solids, fish oil, water, and salt that includes approximately 5 weight % fish protein solids, 2–3 wt. % fish oil, 3 wt. % salt, and the balance water. The temperature of the mixture is approximately 195° F.–200° F. The mixture is introduced into the top of the tank and then allowed to rest without agitation in a quiescent state for about one hour. During this period of time, it is observed that the fish oil and a portion of the suspended fish protein solids in the mixture rise and an oil-water interface is formed. After about one hour, it is noted that about 60% of the volume of the tank is occupied by a float having the consistency of a loose milk shake comprising primarily fish oil and suspended fish protein solids that have risen to the top of the underlying water phase. An analysis of this milk shake-like float indicates that approximately 72% of all of the solids entering the tank have been isolated in the floated material. Thus, the floated material comprises a substantial proportion of the fish oil and suspended fish protein solids that are present in the mixture introduced into the tank. An analysis of the floated material indicates that it is rich in primer fish protein solids and fish oil. The remaining 40% of the volume of the tank is occupied by a large percentage of the water originally present in the original charge and a corresponding amount of salt dissolved therein. This water also includes an amount of dissolved protein solids and some unfloated suspended protein fish solids. The fact that a large percentage of the water initially present in the initial charge comprises the water component and the fact that the salt is dissolved in the water means that removal of the water results in the removal of a large portion of the salt without a removal of a significant amount of the fish protein solids originally present in the initial charge. Accordingly, this example illustrates how, in accordance with the present invention, water and salt can be removed from the process stream of a fish meal processing system without removing a portion of the fish protein solids present therein.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for producing fish meal comprising the steps:
   providing a stream comprising fish protein solids, fish oil, and water;
   delivering the stream to a flotation vessel, wherein the fish protein solids, fish oil, and water are held in a quiescent state such that the fish oil rises forming an oil-water interface, the rising fish oil causing a portion of the fish protein solids to rise to the oil-water interface, thereby defining an oil layer comprising floated fish protein solids and a water layer comprising unfloated fish protein solids;
   isolating at least a portion of the oil layer from the water layer; and
   separating the floated fish protein solids from other components in the isolated oil layer.

2. The method of claim 1, wherein the fish protein solids have a density equal to or greater than water.

3. The method of claim 1, wherein the stream delivered to the flotation vessel is at a temperature ranging between about 150° F. to about 212° F.

4. The method of claim 3, wherein the stream delivered to the flotation vessel is at a temperature ranging between about 190° F. to about 212° F.

5. The method of claim 1, wherein the stream delivered to the flotation vessel includes at least 1% by weight fish oil.

6. The method of claim 5, wherein the stream delivered to the flotation vessel includes at least 1.5% by weight fish oil.

7. The method of claim 6, wherein the stream delivered to the flotation vessel includes at least 2% by weight fish oil.

8. The method of claim 1, wherein the entire oil layer formed in the flotation vessel is isolated from the water layer.

9. A method for producing fish meal comprising the steps:
   cooking fish waste to produce a stream comprising fish protein solids, fish oil, and water;
   pressing the stream to form a press cake and a press fluid, the press cake containing a higher concentration of fish protein solids compared to the press fluid;
   separating additional fish protein solids from the press fluid to provide a secondary press fluid comprising fish protein solids, fish oil, and water;
   concentrating the fish oil and fish protein solids in the secondary press fluid by separating the fish oil and fish protein solids into an oil phase and concentrating the water in the secondary press fluid into a water phase;
   isolating at least a portion of the oil phase from the water phase; and
   treating the isolated oil phase to recover fish protein solids therefrom.

10. The method of claim 9, wherein the secondary press fluid further comprises salt.

11. The method of claim 10, wherein the step of separating the water into a water phase further comprises concentrating salt into the water phase.

12. The method of claim 9, wherein the concentrating step further comprises delivering the secondary press fluid to a flotation vessel, wherein the fish protein solids, fish oil, and water are held in a quiescent state such that the fish oil rises forming an oil-water interface, the rising fish oil causing a portion of the fish protein solids to rise to the oil-water interface thereby defining an oil layer comprising fish oil and floated fish protein solids and a water layer comprising unfloated fish protein solids.

13. The method of claim 12, wherein the concentration of fish protein solids and fish oil in the oil layer is greater than the concentration of fish protein solids and fish oil in the water layer.

14. The method of claim 9, wherein the treating step further comprises:

centrifuging the isolated oil phase to separate it into separate streams rich in fish oil, water and fish protein solids.

15. The method of claim 14, further comprising the step of heating the water rich stream to remove water.

16. The method of claim 14, further comprising the step of heating the stream rich in fish protein solids to remove water.

* * * * *